United States Patent Office 2,773,760
Patented Dec. 11, 1956

2,773,760

PRODUCTION OF TITANIUM METAL

Charles H. Winter, Jr., Wilmington, Del., assignor to E. I. du Pont de Nemours & Company, Wilmington, Del., a corporation of Delaware No Drawing. Application October 25, 1950,
Serial No. 192,158

6 Claims. (Cl. 75—84.5)

This invention relates to the production of the more refractory metals, such as titanium, from their halides, particularly chlorides, by reaction of such halides with reducing metals such as magnesium, sodium and potassium, etc.

More particularly, the invention relates to the recovery of unused reducing metal and certain by-products in the production of such metals as beryllium, columbium, chromium, hafnium, molybdenum, titanium, wolfram, uranium, vanadium and zirconium. More specifically, it deals with the recovery and reuse of residual magnesium, magnesium chloride and titanium subchlorides left with the metallic titanium after the main reduction step in the production of that metal by interaction of titanium tetrachloride and magnesium.

The production of titanium metal by the reduction of titanium tetrachloride with active metals such as sodium and magnesium is well-known, being disclosed in U. S. Patents 2,205,854 and 2,148,345 and in other publications. Generally such methods are batch in character and involve the addition of TiCl₄ to molten magnesium in a closed reaction vessel protected by an atmosphere of an inert gas such as argon, the resulting reaction, which takes place at temperatures ranging from 750–1100° C., producing the desired titanium metal and magnesium chloride in accordance with the following equation:

$$TiCl_4 + 2Mg \rightarrow 2MgCl_2 + Ti$$

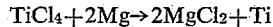

The reaction, however, is not usually stoichiometric and generally some excess magnesium remains in the reactor along with some rather minor amounts of titanium subchlorides such as TiCl₂ or TiCl₃. These sub-chlorides are solids and react strongly with air and moisture, and their removal from the titanium metal prior to contact with moist air is a necessary step in the preparation of the pure metal product. The titanium metal forms as a solid, usually sponge-like mass in the molten magnesium chloride. Upon completion of the reduction, about 85% of this molten salt can be drawn off by regular furnace tapping procedures. The remainder, which will not drain from the metal, is removed by subjecting the sponge to vacuum distillation at temperatures as high as 1000° C. During this distillation the titanium metal product is freed of the sub-chlorides by vaporization or by reactions which produce more titanium metal and volatile products. The excess of magnesium metal left with the product is also distilled off leaving the titanium in a relatively pure form. When the cooled distilling apparatus is opened to moist air, the distillate is immediately contaminated with oxygen due to the hygroscopic nature of the magnesium chloride and the chemical activity of the sub-chlorides of titanium. Because of the great difficulty in handling these by-product materials, they are usually discarded or at best the magnesium recovered by reprocessing.

In a typical example of prior art procedures, a steel vessel is mounted in a suitable furnace capable of heating the vessel to about 700° C. Suitable means is associated with the vessel for flushing it with an inert gas, usually argon, prior to the reduction operation, as well as an inlet means for introducing titanium tetrachloride or other desired metal halide reactant. Magnesium metal is placed within the vessel and melted following sealing. After flushing the reaction vessel with argon or other inert rare gas, about 85% of the TiCl₄ equivalent to the Mg is slowly added. The exothermic reaction results in formation of a titanium "sponge" filled with molten magnesium chloride. This sponge adheres firmly to the walls of the vessel requiring powerful mechanical means to effect separation. When the reaction is completed, about 85% of the molten MgCl₂ is tapped off and the residue subjected to vacuum distillation, either by transferring it to a vessel equipped for vacuum technique, or by placing the original vessel in a vacuum furnace. The distillation leaves a rather pure titanium metal product and the distillate is discarded or at best re-worked to recover the free magnesium metal. To facilitate the removal of the sponge from the vessel, a relatively thin disposable metal liner is often used which makes possible the repeated use of the main vessels. The vacuum distillation step usually does not comprise distilling the volatiles out of the vessel, but rather distilling them from the main body of the vessel where the reaction occurred, to a special upper portion which is cooled. After the product sponge is removed, the condensed material is simply cleaned out by washing and scraping. Thus, it will be seen that some 15% of the magnesium, several percent of the titanium, and 15 to 30% of the magnesium chloride become undesirably lost.

It is among the objects of this invention to avoid these and other disadvantages inherent in prior procedures and to provide novel methods and means for attaining such objects. A particular object is to provide a novel, relatively simple and more economical process for producing refractory metals through reduction of their halides and one which is readily adaptable to commercial utilization. Further objects include the provision of a novel method for recovering and reusing the reducing metal employed and which permits one to simultaneously reclaim and recycle for reuse refractory metal values such as represented by the volatile or decomposable sub-chlorides formed in the process. An additional object is to simplify removal of by-product anhydrous magnesium and sodium chlorides produced in the reduction operation. Other objects and advantages of the invention will be apparent from the ensuing description thereof.

These objects are attained in this invention which involves the preparation of titanium and other refractory metals through reduction of their halides, especially chlorides, at elevated temperatures, with a molten reducing metal in which the reducing metal is initially charged into a plurality of reaction vessels adapted to be maintained in direct communication with each other under an inert atmosphere, thereupon isolating one vessel out of communication with the remainder and reacting its reducing metal charge with a metal halide, upon substantial completion of the reduction reaction withdrawing from the system metal halide reaction product formed during the reduction, volatilizing impurities from the metal sponge reaction product remaining in the reaction vessel by heating it therein under a vacuum and while the vessel is again maintained in communication with a reaction vessel containing said initial charge of reducing metal, and cooling the latter vessel to condense therein vapors evolved in the purification in the presence of said reducing metal charge.

In a more specific embodiment, the invention comprises preparing titanium metal through reduction of vaporized titanium tetrachloride with molten magnesium, by initially charging magnesium metal into at least two reaction vessels adapted to be maintained in direct communication with each other and under an inert atmosphere of a rare gas such as argon, following said charge isolating one of said vessels out of communication with the other and reacting therein volatilized titanium tetrachloride with the magnesium in molten state, upon substantial completion of the reaction removing from said vessel magnesium chloride formed during the reaction, purifying the titanium metal sponge reaction product remaining within said vessel by subjecting it to vacuum distillation therein, during said distillation again maintaining said vessel in open communication with said other vessel and cooling the latter to condense therein in the presence of its magnesium metal charge vapors evolved in said distillation.

In one practical adaptation of the invention in which, for example, titanium metal is obtained by reducing titanium tetrachloride with magnesium, suitable charges of the magnesium reactants, in either ingot, bar, or other desired form, are first introduced into two (or more, if desired) conventional type reaction vessels which are mounted within suitable furnace settings and adapted to be alternately heated through gas firing or externally cooled by air or other suitable means. A valve-controlled conduit, associated with which is an electrical or other suitable heating element, is interposed between each vessel, whereby direct communication between them can be maintained and vapors evolved within one may pass to the other, as desired, or, alternatively, one vessel can be maintained in isolated relationship while a reduction operation is being carried out therein. Preferably all vessels are made up of corrosion-resistant steel or other metal or alloy capable of withstanding relatively high temperatures and corrosive fluid action, and suitable inlets and outlets are provided in each for introducing therein a metal halide reactant, an inert gas, etc., or for withdrawing therefrom reaction products and by-products. A low carbon steel or other type of removable protective liner is also provided in each vessel, said liner being adapted to receive and retain a reducing metal charge and other reactants and the resulting products of reaction to maintain them out of direct contact with the internal surfaces of the reactor. Upon completion of reaction, the liner affords ready withdrawal of final metal reaction product from the vessel. Suitable venting and pressure regulating means also can be associated with the reactors whereby the reduction operation can be effected under either subatmospheric, superatmospheric, or atmospheric pressures, as desired.

Upon introduction into the conjointly associated reactors of the desired amount of magnesium, the cover elements of each are secured and sealed in gas-tight relationship to the vessels. With the valve in the intercommunicating conduit in "open" position, an inert or neutral atmosphere is maintained within each vessel by flowing argon or other inert gas therein and until the vessel is purged of air, oxygen, or other undesired contaminants. The valve is then closed and the reduction operation is then carried out in a single retort while isolated from thte remainder or associated retorts. In such reduction, the reactor is heated to temperatures ranging from about 750–1100° C., and preferably from 850–1000° C. In the course of such heating, the magnesium is rendered molten. Upon conclusion of the melting, liquid titanium tetrachloride is introduced into the reactor at a controlled rate, becomes immediately vaporized and reacts with the molten magnesium under an inert atmosphere to form free titanium metal sponge and the halide salt of the reducing metal in accordance with the equation set forth above. Upon reaction completion, a portion of the magnesium chloride by-product formed is withdrawn from the reactor and is discharged from the system. Vacuum distillation is then undertaken to purify the titanium metal sponge remaining within the reactor. This is accomplished by first evacuating an associated reaction vessel (or vessels) to which magnesium has been previously charged, as above mentioned, and until the desired degree of vacuum is reached. The evacuated vessel is then cooled by passing thereover a cooling fluid, such as air, following which the interconnecting conduit and reactor containing the metal sponge are heated to a temperature above the volatilization point of the magnesium chloride or other impurity present, or to about 1000° C. During such heating the vapor valve in the interconnecting conduit is slowly opened to bring the reactor vessels into direct communication with each other. Vapors evolved in the distillation pass into the cooled associate reactor and condense therein in the presence of its magnesium content. Upon completion of the volatilization after several hours of heating, argon or other inert gas is admitted into each retort and the vapor valve in the interconnecting conduit is again maintained in closed position to effect isolation of the titanium metal containing retort from the system. The latter vessel is then cooled and its titanium product is recovered by removing it therefrom with the protective liner for final recovery, treatment or fabrication. The retort utilized to condense vapors evolved in the distillation is then employed in a new reduction operation by passing liquid TiCl$_4$ reactant therein and repeating the reduction process above described in respect to the retort used in producing the recovered titanium metal product. Upon completion of this second reduction operation, the first reactor is employed as a condensation zone for vapors evolved from the metal sponge obtained in such second reduction, said first reactor having in the meantime been recharged with magnesium metal and maintained under an inert atmosphere after removal of its purified titanium metal product.

To a clearer understanding of the invention, the following specific example is given, which is merely in illustration but not in limitation of the invention:

*Example*

Two vertical cylindrical steel retorts, adapted to be externally heated or cooled, 14" in diameter and 38" high, were connected by means of a 4" diameter vapor conduit provided with a 4" valve to form an inverted U. Each retort was mounted for removal in a conventional type refractory furnace setting arranged for gas firing heating to any desired temperature or air cooling. Each was provided with suitable inlets and outlets for introducing and withdrawing reactants and reaction products. The interconnecting vapor conduit was provided with a surrounding electrical heating unit and insulated so that its temperature could be maintained at about 750° C., as desired. Each retort was initially charged with 30 pounds of magnesium metal bars, and both retorts were then flushed with argon gas to provide an inert atmosphere. The vapor valve in the interconnecting conduit was closed and retort (1) was then heated to 850° C. to melt its magnesium content. Liquid TiCl$_4$ was then admitted to this retort at a rate of 0.05 gallon per minute. After 100 pounds of TiCl$_4$ had been added and 78 pounds of liquid MgCl$_2$ had been tapped off, retort (1) was sealed at the MgCl$_2$ drawoff or tap hole outlet and retort (2) was evacuated to 20 mm. Hg. by means of a pump connected to the MgCl$_2$ tap hole. The 4" vapor valve was then slowly opened while the temperature of the interconnecting conduit and furnace containing retort (1) was maintained at about 1000° C. Retort (2) was maintained in cooled state by blowing air through the furnace containing it until its temperature was sufficiently low to condense vapors evolved in retort (1) from the heating of its sponge metal titanium reaction product. After maintaining retort (1) at 1000° C. for six hours, impurity volatilization and removal became substantially complete, the pressure in the system dropping to about eight microns of mercury. Admission of argon to both retorts was then effected and the vapor valve in the interconnecting conduit was again closed, with retort (1) being cooled by blowing air thereover through its furnacing means. Thereupon, retort (2) was heated to 850° C. and a repetition of the reduction operation effected in retort (1) was carried out by admitting liquid TiCl₄ thereto at a rate of 0.05 gallon per minute. After the addition of 117 pounds of TiCl₄ and the tapping off and removal of 113 pounds of MgCl₂ from the system, retort (2) was sealed at its tap hole. Meanwhile, retort (1) had been cooled and after removal of its purified titanium metal for further treatment, use or fabrication, this retort was then recharged with magnesium bars, returned to the furnace and connected to retort (2) by means of the vapor conduit. The sponge metal reaction product in retort (2) was then purified by vacuum-heat treatment and in the manner described above in respect to retort (1). Upon conclusion of the purification operation, retort (1) (now containing condensed distillate and magnesium) was re-employed as a reactor for reducing further quantities of TiCl₄ reactant, the involved operation being a repetition of that resorted to above in effecting the initial reduction carried out in that retort, all to the end that a continuing, cyclic process was afforded. From the successive and continuous reductions thus afforded by retort (2) and those following in this series of operations, the following yields, on the average, were obtained:

Pounds of Ti _____ 28.5
Pounds molten MgCl₂ _____ 113.0
Yield of Ti from TiCl₄ _____ percent__ 95
Yield of Ti from 30# Mg _____ do____ 95
Yield of molten MgCl₂ from TiCl₄ _____ do____ 97

In contrast to the foregoing, prior art methods, wherein the distillate is discarded, yielded the following results from equivalent experiments:

Pounds of Ti _____ 21.0
Pounds molten MgCl₂ _____ 78.0
Yield of Ti from TiCl₄ _____ percent__ 84
Yield of Ti from 30# Mg _____ do____ 70
Yield of molten MgCl₂ from TiCl₄ _____ do____ 78

While described as applied to certain specific embodiments, the invention is not restricted thereto. Thus, while magnesium comprises a preferred type of reducing metal, other metals can be used in substitution therefor. Magnesium is commercially most attractive for use because readily available in pure large quantities and has almost twice as much reducing power per unit weight as other reducing agents, such as sodium. Generally, use is contemplated of any metal which is more electropositive than the metal being produced. Metals especially useful as reducers include those which in aqueous solutions have electrode potential values of 1.70 or greater, as shown by the Electromotive Force Series. Of these, the alkali and alkaline earth metals are particularly useful since their electrode potentials are all greater than 2.0, to thereby insure their rapid reaction at temperatures of 750° C. or higher, which are normally utilized in the process. Among specific examples of contemplated reducing metals, those of magnesium, calcium, barium, strontium, sodium, potassium, or lithium can be mentioned. These are molten at 750° C. or higher and have relatively low specific gravities, forming a liquid halide as a by-product in the reaction which enables ready separation and removal of such by-product from the metal sponge reaction product.

Again, while the invention has been illustratively described in its preferred application to the production of titanium, it will be understood that it is generally utilizable for the production of refractory metals generally, and particularly such metals as beryllium, chromium, columbium, hafnium, molybdenum, titanium, wolfram, vanadium, uranium, zirconium, etc. In their production, in accordance with the invention, any of the halides of said metals, and particularly those the halogen component of which has an atomic number greater than 9, i. e., chlorine, bromine, or iodine, can be used. The chlorides, such as TiCl₄, ZrCl₄, BeCl₂, VCl₄, MoCl₄, etc., are particularly adaptable for use herein and hence, as already noted, are preferred for use.

In effecting the reduction operation, the rate of reaction and the pressure which prevails within the reactors employed can be suitably controlled by resorting to a neutral or inert atmosphere. While argon comprises a preferred type of protective or inert gas, other inert elements of Group Zero of the Periodic System, such as helium or neon, or mixtures thereof, can be used, as may be any other inert gas which is free from undesirable reactants, especially oxygen and nitrogen. When employing argon, a substantial partial pressure of that gas within the reactor is preferred for use in the reaction. This is adjusted to 760 mm. or higher during the tapping operation to avoid air influx, while the contents of the vessel are at or above the melting temperature of the metal halide reaction product. Alternatively, subatmospheric as well as atmospheric or pressures above atmospheric (say, from 1–3 atmospheres or higher) can be resorted to.

The distillation step may be effected by resorting to any suitable arrangement of apparatus. Thus, the interconnecting vapor conduit may be greatly shortened by inverting the distilling retort over the receiving retort. The upper temperature limits for both the distilling retort and the vapor conduit are set by the materials of which they are constructed. In using iron equipment, it has been found satisfactory to keep the vapor conduit somewhat above the melting point of MgCl₂ and to finally heat the distilling retort to about 1000° C. Heating of the retorts may be effected in an evacuated furnace in order to minimize distortion under stress of temperature and pressure.

If desired, materials volatilized in the distillation may be introduced into an empty reactor but it will be found preferable, as noted above, to charge the condensation reactor with the magnesium or other metal reducing agent in the form of bars or ingots prior to introducing the distillate. In this manner, the danger of admitting air or moisture into the presence of the sensitive materials is avoided and the presence of the cold reducing metal assists in vapor condensation. In the instance of titanium production, it will be found particularly advantageous to condense the volatile sub-chloride of titanium on the magnesium metal where it will later be reduced.

Certain titanium compounds such as the sub-chlorides have been included in the volatile matter which is recovered by distillation. While the distillation of magnesium chloride and magnesium metal is quite simple, the behavior of the titanium compounds is not so straightforward. Significant amounts of solid titanium compounds, presumably TiCl₂ and TiCl₃, remain in the reactor after reduction and it is very desirable that they be removed prior to exposing the metal product to air since they absorb oxygen and may even be pyrophoric. When they are subjected to heat and low pressure, a combination of results is obtained involving vaporization as well as disproportionation to Ti and TiCl₄. The equilibria involved here are described by Brewer on pages 221 and 222 of "The chemistry and metallurgy of miscellaneous materials," National Nuclear Energy Series IV–19B. In addition to these equilibrium reactions, there is also some actual reduction of these chlorides by the magnesium vapor as it distills out of the sponge. The overall effect of these processes is to transfer some of the volatile titanium values to the receiver for reuse and to convert the remaining titanium to the metallic state so that it becomes additional product.

One major advantage of the invention resides in the excellent titanium yields shown above. Other advantages also exist, such as the recovery of by-product magnesium chloride. In prior operations about 15 to 30 percent of the MgCl₂ is left in the titanium sponge after tapping, to be distilled off or leached out and discarded. If attempts were made to recover all the MgCl₂, at least two stations for handling the salt would be required. According to this invention, about 97% of the magnesium chloride is recovered by simple tapping at one location. Furthermore, the presence of the recycled magnesium chloride in the reactor prior to melting the magnesium metal has the distinct advantage of being more readily retained by the tapping valve than does molten magnesium. Since the molten magnesium floats on the chloride, magnesium leakage and its consequent hazard are largely overcome and avoided.

It will be seen from the foregoing that the invention provides a novel method for obtaining a refractory metal by reduction of a halide of the metal with a metallic reducing agent; that a cyclic batch type of operation is afforded wherein use is had of a novel combination of reactors; that conveniently the reduction step is effected within one reactor while that reactor is temporarily isolated from an associated or secondary reactor; and that upon evacuating both reactors and heating the one employed in the reduction to distill off residual by-product salt, excess reducing metal and volatile refractory metal chlorides, the secondary reactor (containing a fresh reducing metal charge for a subsequent reduction in the cycle) acts as a condenser and receiver for vapors evolved and distillate formed from the volatilization prior to utilization of said reactor as a reducing vessel in the cyclic operation. Furthermore, each retort may be moved from one stage or station to another in the process to effect a complete cycle. Thus, for example, a retort may be successively passed through the following stages: magnesium charging, vacuum receiving, reduction reaction, magnesium chloride tapping, vacuum distillation, cooling and discharging.

As already indicated, many widely different variations of the invention can be resorted to without departing from its spirit and scope. Hence, it will be understood that the invention is not limited to the specific embodiments set forth above but only as defined in the appended claims.

I claim as my invention:

1. A method for refractory metal production comprising reducing a halide of said metal the halogen component of which has an atomic number greater than 9 by charging a reducing metal selected from the group consisting of alkali and alkaline earth metals having an electrode potential in aqueous solution greater than 2.0 into a plurality of closed reaction vessels maintained in direct communication with each other and under an atmospheric of an inert rare gas, isolating one of said vessels from the remainder and reacting the reducing metal charge therein with said metal halide at a reaction temperature ranging from 750–1100° C., upon substantial completion of the reaction withdrawing therefrom while in molten state metal halide reaction by-products formed during the reduction reaction, heating the sponge metal reaction product remaining in said vessel under a vacuum to distill off and remove refractory metal subhalides and reducing metal impurities present in said sponge, during the distillation operation again maintaining the plurality of reaction vessels in direct communication with each other and passing vapors evolved in such distillation into a vessel containing unreacted reducing metal charge while subjecting the latter vessel to external cooling to condense therein the vapors being passed thereto, upon completion of the purification and distillation operation again isolating the vessel containing said sponge metal product from the vessel into which said evolved vapors have been passed, recovering the purified refractory metal from said isolated vessel, and reacting within said temperature range the unreacted reducing metal charge in said vessel into which said evolved vapors have been passed with said refractory metal halide reactant and in the presence of the condensed products from said distillation operation.

2. A method for producing a refractory metal by reducing a halide of said metal, the halogen component of which has an atomic number greater than 9, with a reducing metal selected from the group consisting of alkali and alkaline earth metals, comprising charging the reducing metal into a plurality of associated reaction vessels maintained in direct communication with each other and under an atmosphere of an inert, rare gas, isolating one of said vessels from the remainder and reacting the reducing metal present therein with said metal halide at a temperature ranging from about 850–1000° C., upon substantial completion of the reduction reaction in said isolated vessel withdrawing therefrom in molten state metal halide reaction by-product, thereafter subjecting the sponge metal reaction product remaining therein to vacuum distillation treatment at a temperature of about 1000° C., to distill off and remove from said sponge refractory metal subhalides and reducing metal impurities present therein, again maintaining said plurality of reaction vessels in direct communication with each other and passing the vapors evolved from said distillation into an externally cooled reaction vessel containing an unreacted reducing metal charge to condense the vapors being fed thereto from said distillation, upon completion of said distillation operation, again isolating the vessel containing said sponge metal reaction product from the vessel into which said distillation vapors have been fed, recovering therefrom the resulting purified metal product, and reacting with said refractory metal halide under an inert atmosphere and at temperatures ranging from about 850–1000° C. the reducing metal charge in the reaction vessel into which said evolved vapors have been passed and in the presence of the condensed products from said distillation.

3. A process for producing titanium metal by reducing titanium tetrachloride with magnesium in a closed reaction vessel and at an elevated temperature, ranging from 750–1100° C., comprising charging the magnesium into a plurality of closed reaction vessels maintained in direct communication with each other, upon completion of said magnesium charge maintaining each of said vessels under an inert atmosphere, isolating one of said vessels out of direct communication with the remainder and reacting its charge of magnesium while in molten state with titanium tetrachloride and within said temperature range, upon substantial completion of the reaction withdrawing from said vessel, in molten state, magnesium chloride by-product formed in the reaction, subjecting the titanium metal sponge reaction product to heating and vacuum distillation within said vessel to vaporize and remove from said sponge titanium subchlorides and magnesium present therein and while the vessel is again maintained in direct communication with another vessel to which a charge of magnesium had been previously made, during said vacuum distillation passing vapors evolved into the latter vessel and externally cooling it to condense said vapors therein, upon completion of said distillation, again isolating the vessel containing said titanium sponge metal from the vessel into which said distillation vapors have been passed, recovering therefrom the purified sponge metal obtained therein and reacting with titanium tetrachloride at said temperature range and in the presence of the condensed products from said distillation the unreacted magnesium charge in the vessel to which the vapors from said distillation have been passed.

4. A process for producing titanium metal by reduction of titanium chloride at temperatures ranging from 850°–1000° C., with magnesium, comprising charging the magnesium into a plurality of closed, separate reaction vessels maintained in direct communication with each other, upon completion of magnesium introduction into said vessels maintaining each under an inert rare gas atmosphere, thence isolating one vessel out of direct communication with the remainder and reacting titanium tetrachloride with its magnesium content at said temperture and while the magnesium is in molten state, upon substantial completion of the reaction withdrawing magnesium chloride by-product in molten form from said vessel and subjecting the titanium metal sponge reaction product remaining therein to vacuum distillation treatment to distill off and remove therefrom titanium subchlorides and magnesium impurities, during said distillation again maintaining said vessels in direct communication with each other and passing the vapors evolved in the distillation into the vessel containing the unreacted magnesium charge, subjecting the latter vessel to external cooling during said vacuum distillation operation to condense therein said evolved distillation vapors, upon completion of the distillation operation isolating the titanium metal-containing vessel from the vessel containing said unreacted magnesium charge to recover its purified metal content, and reacting the magnesium in said vessel to which said distillation vapors have been passed with titanium tetrachloride at 850–1000° C. in the presence of the condensed products from said distillation.

5. A cyclic process for producing titanium metal through reduction of titanium tetrachloride with molten magnesium at elevated temperatures ranging from 850–1000° C., comprising charging to a plurality of reaction vessels sufficient magnesium to effect the reduction reaction, upon completion of the introduction of said charge maintaining each of said vessels in direct communication with each other and under an inert rare gas atmosphere, isolating one vessel out of communication with the remainder and reacting its magnesium metal charge with vaporized titanium tetrachloride at said 850–1000° C. temperature, upon substantial completion of the reaction withdrawing therefrom its molten magnesium chloride by-product content and subjecting the remaining titanium metal sponge reaction product to purification treatment therein by heating the same under a vacuum to distill off therefrom titanium subchlorides and magnesium impurities and while the vessel is again maintained in direct communication with a vessel containing an original, unreacted charge of magnesium, during said purification externally cooling said latter vessel and passing thereto vapors evolved in said distillation for condensation upon said unreacted magnesium charge, upon completion of the distillation operation again isolating the reaction vessel in which it is produced and recovering the resulting purified titanium metal, and then reacting at 850–1000° C., and in the presence of said subchloride and magnesium distillation products titanium tetrachloride with the magnesium charge in the vessel in which said distillation vapors have been passed.

6. A process for producing titanium metal by reducing a titanium halide in which the halogen component has an atomic number greater than 9 at temperatures ranging from 750–1100° C., comprising charging a reducing metal selected from the group of alkali and alkaline earth metals, into a plurality of reaction vessels, maintaining said vessels under an inert atmosphere and isolating one vessel from the remainder and reacting its reducing metal charge in molten state and at said temperatures with said titanium halide under said inert atmosphere, upon substantial completion of the reaction withdrawing from the titanium metal reaction product and vessel molten reducing metal halide by-product formed in the reaction, subjecting the titanium metal sponge reaction product while retained in said isolated vessel to vacuum distillation to distill off and remove therefrom titanium subhalide and reducing metal impurities present therein, during said distillation again maintaining said isolated vessel in direct communication with a vessel containing a charge of unreacted reducing metal and passing vapors evolved in said distillation to said latter vessel while externally cooling it to condense therein the vapors evolved in said distillation operation, upon completion of the distillation again isolating the titanium metal product-containing vessel and recovering the purified titanium metal, and reacting the magnesium and distillate content of the vessel to which said distillation vapors are passed with a titanium halide at said 750–1100° C. temperature and atmosphere to produce and recover titanium metal as a product.

References Cited in the file of this patent
UNITED STATES PATENTS

| | | |
|---|---|---|
| 1,046,043 | Weintraub | Dec. 3, 1912 |
| 1,306,568 | Weintraub | June 10, 1919 |
| 2,205,854 | Kroll | June 25, 1940 |
| 2,486,475 | Kawecki | Nov. 1, 1949 |
| 2,556,763 | Maddex | June 12, 1951 |
| 2,564,337 | Maddex | Aug. 14, 1951 |

OTHER REFERENCES
Steel, July 24, 1950, pages 63, 64 and 76.